(12) United States Patent
Van Leeuwen et al.

(10) Patent No.: US 9,041,792 B2
(45) Date of Patent: May 26, 2015

(54) GENERATION OF A MULTICOLOUR IMAGE OF AN UNSTAINED BIOLOGICAL SPECIMEN

(75) Inventors: Marinus B. Van Leeuwen, Eindhoven (NL); Stein Kuiper, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 372 days.

(21) Appl. No.: 13/131,329

(22) PCT Filed: Nov. 19, 2009

(86) PCT No.: PCT/IB2009/055159
§ 371 (c)(1), (2), (4) Date: May 26, 2011

(87) PCT Pub. No.: WO2010/061319
PCT Pub. Date: Jun. 3, 2010

(65) Prior Publication Data
US 2011/0228072 A1 Sep. 22, 2011

(30) Foreign Application Priority Data
Nov. 27, 2008 (EP) .................................. 08305854

(51) Int. Cl.
| | |
|---|---|
| G06K 9/00 | (2006.01) |
| H04N 7/18 | (2006.01) |
| A63B 43/02 | (2006.01) |
| G06T 5/50 | (2006.01) |
| G06T 7/40 | (2006.01) |
| G06T 11/00 | (2006.01) |

(52) U.S. Cl.
CPC . *A63B 43/02* (2013.01); *G06T 5/50* (2013.01); *G06T 7/408* (2013.01); *G06T 11/001* (2013.01); *G06T 2207/10056* (2013.01); *G06T 2207/10152* (2013.01); *G06T 2207/30024* (2013.01)

(58) Field of Classification Search
CPC .......... A63B 43/02; G06T 5/50; G06T 7/408; G06T 2207/30024; G06T 2207/10056; G06T 2207/10152; G06T 11/001
USPC ............... 348/79, 80; 382/128, 133, 134, 154
See application file for complete search history.

(56) References Cited

U.S. PATENT DOCUMENTS 5,784,162 A * 7/1998 Cabib et al. ................... 356/456
6,690,817 B1 * 2/2004 Cabib et al. ................... 382/134
(Continued)

FOREIGN PATENT DOCUMENTS

WO 0067635 A1 11/2000
WO WO 0067635 A1 * 11/2000
(Continued)

OTHER PUBLICATIONS

Bautista et al. "Digital Staining of Unstained Pathological Tissue Samples through Spectral Transmittance Classification". Optical Review, vol. 12, No. 1, Jan. 2005, pp. 7-14.*
(Continued)

*Primary Examiner* — Christopher S Kelley
*Assistant Examiner* — Zhihan Zhou

(57) ABSTRACT

At least two chemically different substances of interest of an unstained biological specimen that for each a substance image is generated, indicating for every region of the image an amount of the substance. A multicolor image is generated on the basis of the substance images.

8 Claims, 4 Drawing Sheets

(56) References Cited

U.S. PATENT DOCUMENTS

| | | | |
|---|---|---|---|
| 6,750,964 | B2 | 6/2004 | Levenson |
| 6,804,385 | B2 * | 10/2004 | Eisfeld et al. ............... 382/128 |
| 7,027,627 | B2 * | 4/2006 | Levin et al. ............... 382/128 |
| 7,133,543 | B2 | 11/2006 | Verwoerd |
| 7,133,547 | B2 | 11/2006 | Marcelpoil |
| 2006/0044429 | A1 * | 3/2006 | Toda et al. ............... 348/272 |
| 2007/0026525 | A1 | 2/2007 | Marcelpoil |
| 2007/0031097 | A1 * | 2/2007 | Heikenfeld et al. ......... 385/129 |
| 2010/0296111 | A1 * | 11/2010 | Diegel ............... 358/1.9 |
| 2011/0050984 | A1 * | 3/2011 | Schulz ............... 348/370 |

FOREIGN PATENT DOCUMENTS

| | | | |
|---|---|---|---|
| WO | WO 2006103042 | A1 * | 10/2006 |
| WO | 2007059629 | A1 | 5/2007 |
| WO | WO 2008075266 | A2 * | 6/2008 |

OTHER PUBLICATIONS

Abe, Tokiya et al "Color Correction of Pathological Images Based on Dye Amount Quantification", Optical Review, vol. 12, No. 4, 2005, pp. 293-300.

Zesking, Benjamin J. et al "Nucleic Acid and Protein Mass Mapping by Live-Cell Deep-Ultraviolet Microscopy", Nature Methods, vol. 4, No. 7, Jul. 2001, pp. 567-569.

Chung, A. et al "Advanced Optical Imaging Requiring No Contrast Agents—A New Armamentarium for Medicine and Surgery" Current Surgery, vol. 62, No. 3, May 1, 2005, pp. 365-370.

Bautista, Pinky A. et al "Digital Staining of Unstained Pathological Tissue Samples through Spectral Transmittance Classification" Optical Review, vol. 12, No. 1, Jan. 1, 2005, pp. 7-14.

* cited by examiner

GENERATION OF A MULTICOLOUR IMAGE OF AN UNSTAINED BIOLOGICAL SPECIMEN

FIELD OF THE INVENTION

In a first aspect, the invention relates to a method of generating a multicolour image of an unstained biological specimen, the specimen comprising at least two chemically different substances of interest.

In a second aspect, the invention relates to a data carrier.

In a third aspect, the invention relates to a system for generating a multicolour image of an unstained biological specimen, the object comprising at least two chemically different substances of interest.

BACKGROUND OF THE INVENTION

In histopathology and cytopathology a pathologist routinely analyses microscopic images taken from tissues or cell smears. The specimens are typically analysed with a standard microscope using visible light. Due to the fact that cells and tissues hardly absorb visible light it is a common practice to stain the specimens. The staining chemical can be observed in visible light. It indicates the presence and generally also the amount of the structure it typically binds to. During many years of training and experience a pathologist learns how to interpret the stained images of specimens and to come to a diagnosis. In the digital pathology community the use of staining chemicals is generally considered mandatory for imaging slide samples in transmission.

Which staining method is chosen typically depends on the specific structure the pathologist is interesting in. A very popular staining method is the hematoxylin and eosin (H&E) stain. The hematoxylin binds to basophilic structures and colours them with a blue-purple hue. Basophilic structures are, for example, those cell components which contain nucleic acids and the cytoplasmic regions rich in RNA. Eosinophilic structures are generally composed of intracellular or extracellular protein and are coloured pink by the eosin.

However, staining has several major disadvantages. One of them is that the colour rendering in image of a stained specimen strongly depends on the stain method that has been used. The quality of the staining is not constant, as pointed out by T. Abe et al (T. Abe et al, "Colour Correction of Pathological Images Based on Dye Amount Quantification". Optical Review, Vol. 12, No. 4, 2005, pp. 293-300). Yet a good quality is important for enabling the pathologist to come to a proper diagnosis. Another problem is related to the transfer of traditional pathology to automated diagnosis, which is an important development today. Quality variations observed among hospitals or even among staining machines or in staining machines over time present a serious hurdle for automated diagnosis. Different solutions have been proposed in order to solve these problems, such as improving the control of the staining process or by digitally correcting the multicolour image of the stained sample by means of a computer (see the above-mentioned article by T. Abe et al).

It is an object of the invention to provide a way of generating a multicolour image of an unstained biological specimen which does not require staining the specimen.

This object is achieved by the features of the independent claims. Further specifications and preferred embodiments are outlined in the dependent claims.

SUMMARY OF THE INVENTION

According to the first aspect of the invention, the method comprises
  generating for each of the substances of interest a substance image indicating for every region of the image an amount of the substance;
  generating the multicolour image on the basis of the substance images. Each substance image is thus a map of the distribution of the respective substance in the specimen. The substance images can be obtained by any suitable method. In particular it is proposed to measure the absorbance of light of multiple wavelengths by the specimen and to translate this measurement data into RGB image data. The RGB image data may be a close approximation of an RGB image of the specimen if the latter had been stained with e.g. the popular staining method Hematoxylin & Eosin (H&E) and viewed with a traditional microscope. Thus staining can be completely avoided. The invention may be applicable to the entire field of histopathology. Staining is customary for almost all tissues/cells based diagnoses (in the order of 300.000+ samples per hospital per year). Avoiding the staining procedure could dramatically increase the throughput time and facilitate a (partial) automation of diagnosis by computers.

The specimen may be substantially transparent for visible light, having a transmissivity of, for example, more than 80%, or of more than 90%. The specimen may be a histopathological specimen, and it may be arranged on a microscope slide.

Generating the multicolour image on the basis of the substance images may comprise
  assigning to each of the substances of interest a postulated colour;
  converting each of the substance images into a single-colour image having the assigned colour;
  superimposing the single-colour images.

At least one of the substances of interest may be assigned a colour that matches the colour of a dye capable of binding to that substance. More specifically, it is proposed to
  acquire a first image using an imaging/detection modality that allows to measure quantities of elements present in an unstained specimen, for example, via absorbance variation,
  estimate the quantity of at least one of the elements,
  create a second image that is coloured as if the specimen had been stained with a predefined stain chemical (e.g. H&E) by using the estimated quantity. Thus the final image shows a representation the pathologist is familiar with, although the specimen has not been stained. It may be noted here that there is a strong prejudice in the digital pathology world against any imaging technique that would create black-and-white (B&W) or greyscale images. Pathologists have emphasized that for them it is crucial that whatever a computer does, important steps to come to a final diagnosis have to be made visual to the pathologists in a way they understand and in a way they are used to. In particular a pathologist is not likely to be satisfied with a single-colour image of, e.g., two neighbouring nuclei with in overlay a number indicating the amount of nucleic acids in each nucleus. He will rather accept a multicolour image with the numbers in overlay. The colours of the nucleus will indicate a heavier staining for the nucleus with higher amount of nucleic acid, similar as H&E staining would have done.

The specimen may comprise as a first substance of interest protein and as a second substance of interest nucleic acid. The protein may be assigned a red or pink colour, and the nucleic acid may be assigned a blue, violet, or purple colour.

The multicolour image may be obtained from the superimposed single-colour images according to a subtractive colour model. That is, each of the colours assigned to the various substances of interest acts as a filter transmitting only the assigned colour. The multicolour image may then be produced by superimposing the single-colour images on a white background. Superimposing, for example, blue and red would produce a grey tone or black, rather than purple. Thereby the resemblance of the multicolor image to a conventional staining-based image can be improved.

The steps of converting and of superimposing may be performed on a computer.

Converting each substance image into a single-colour image may comprise
consulting a lookup table relating an amount of substance to a colour intensity, and/or
evaluating an exponential function relating an amount of substance to a colour intensity.

Generating the multicolour image on the basis of the substance images may comprise
assigning to each of the substances of interest a postulated absorption spectrum in the visible frequency domain;
computing a transmitted light image on the basis of the substance images and the postulated absorption spectra, the transmitted light image indicating for every region of the image a spectrum of light that would be transmitted by the substances of interest if they were illuminated by white light, assuming that each of these substances has the postulated absorption spectrum.

The transmitted light image is thus generated by simulating a transmission of light by the substances of interest, wherein the postulated absorption spectrum is used instead of the true absorption spectrum of these substances. This may ensure that the resulting multicolour image imitates particularly well an image obtained by a staining method. The light to be transmitted by the substances of interest in the simulation may in particular be white light.

The transmitted light image may be computed using the Beer-Lambert law with, as input data, the substance images and the postulated absorption spectra.

The substance images may be determined by
exposing the specimen to ultraviolet light of a selected frequency;
measuring for various regions of the specimen the intensity of transmitted ultraviolet light;
performing the steps of exposing and of measuring for different frequencies, thus generating for each frequency an ultraviolet image;
deriving from the ultraviolet images the substance images.

The substance images are thus acquired by means of a multispectral analysis. UV wave lengths may be particularly advantageous because unstained specimens do not absorb visible light. As is well-known, cells and tissues absorb light with high (UV/deep-UV) frequencies. Zeskind et al (B. J. Zeskind et al, "Nucleic acid and protein mass mapping by live-cell deep-ultraviolet microscopy". Nature Methods, Vol. 4, No. 7, July 2007, pp. 567-569) showed that spectral information obtained from multispectral images allows estimating the amount of certain structures (e.g. nucleic acids or protein) in a cell. Using multispectral images of the tissue/cells the amount of certain structures of the tissue/cell can be estimated per image pixel by comparing the images. This knowledge can be combined with the knowledge of the 'ideal' spectra of the staining chemicals typically used to identify these structures. From this combination an RGB colour image illustrating the tissue/cells as if it had been stained can be created artificially, i.e. by means of a computer. This procedure will lack the disadvantages of staining, yet produce a similar output. 'Ideal' depends on the application. Most pathologists have a personal definition for quality of a certain staining. For automation purpose best contrast might be preferred. However, a user is free to use whatever spectrum he likes best.

The substance images may be derived from the ultraviolet images using the Beer-Lambert law. This will be outlined in greater detail below.

According to the second aspect of the invention, a data carrier carries instructions for instructing a computer to control or to perform the method summarized above. The computer may be a PC or any other suitable information processing device or electronic controller.

According to the third aspect of the invention, the system for generating a multicolour image of the unstained specimen comprises
an optical system for exposing the specimen to ultraviolet light of a selected frequency and for measuring for various regions of the specimen the intensity of transmitted ultraviolet light and for repeating the steps of exposing and of measuring for different ultraviolet frequencies, thus generating for each frequency an ultraviolet image;
a computer for generating substance images on the basis of the ultraviolet images and for generating the multicolour image on the basis of the substance images.

The optical system may comprise a microscope. The microscope may serve for both illuminating the specimen and for collecting light from the specimen. The microscope may be a conventional optical microscope or a scanning microscope.

DESCRIPTION OF PREFERRED EMBODIMENTS

Figure 1:
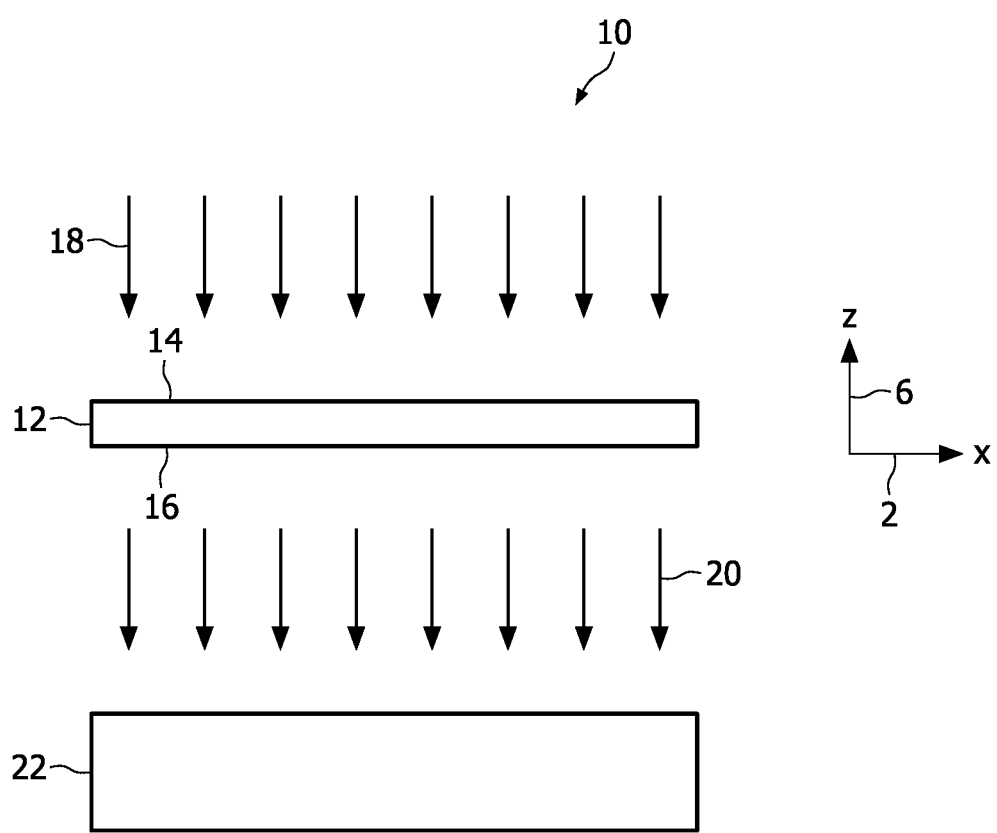
FIG. 1 schematically illustrates an apparatus for generating a multicolour image of an unstained specimen.

Unless specified otherwise, identical or similar reference numerals appearing in different Figures label identical or similar components.

Figure 2:
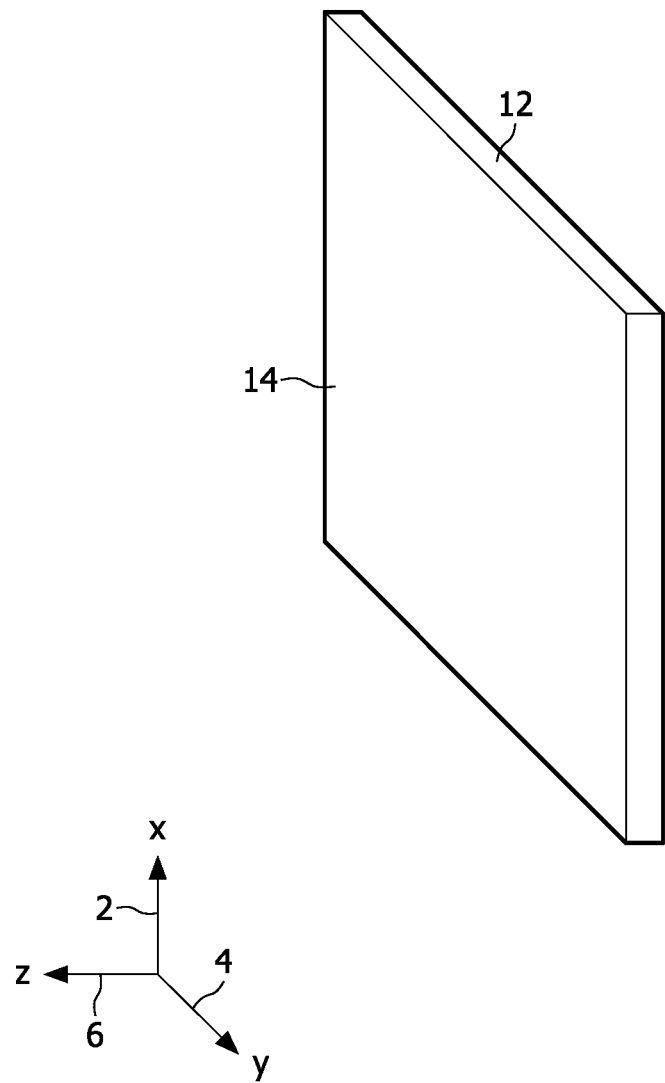
FIG. 2 schematically illustrates the specimen.

FIG. 1 illustrates schematically a system 10 for generating a two-dimensional multicolour image of a specimen 12 while FIG. 2 provides a perspective view of the specimen 12. The specimen 12 may, for example, be a liquid layer containing organic material such as individual cells, or a slice of paraffin in which biological material has been embedded. The specimen 12 extends principally along an x-y-plane perpendicular to the plane of the Figure. The specimen 12 comprises at least a first substance (e.g. protein) and a second substance (e.g. nucleic acid). Ultraviolet light 18 of a first frequency is shone onto an upper surface 14 of the specimen 12. Transmitted ultraviolet light 20 of the same frequency leaves the specimen 12 via a lower surface 16 and reaches a detector 22. The detector 22 is coupled to a computer (not shown), for example, a personal computer, or another suitable information processing device, carrying a programme for registering data delivered by the detector 22 in response to the transmitted ultraviolet light 20. Thus a first ultraviolet image of the specimen 12 is generated. In a subsequent step ultraviolet light (not shown) of a second frequency is shone onto the upper surface 14 of the specimen 12, resulting in a second ultraviolet image of the specimen 12. The spatial distribution of the first substance and of the second substance over the region of interest, i.e. over the image region, are derived as follows in an approach similar to the one suggested by Zeskind et al (see the above-mentioned article), using the Beer-Lambert law. Consider the intensity $I(\nu, z)$ of light of frequency $\nu$ on a selected axis parallel to the z-axis 6 in the specimen 12. At a specific z-position the intensity can be approximated as $$I(\nu,z)=I_0(\nu)\exp(-\sigma_1(\nu)(N_1(z)-\sigma_2(\nu)N_2(z))$$

where $\sigma_1(\nu)$ and $\sigma_1(\nu)$ are the absorption cross sections (in square meters, for example) of the first substance and of the second substance, respectively, and $N_1(z)$ and $N_2(z)$ are the numbers of particles per unit area on the axis between the positions 0 and z, of the first substance and of the second substance respectively. More precisely, $N_1(z)$ and $N_2(z)$ are the numbers of particles having a projection along the z-direction on that unit area, divided by the unit area. The 0 position is chosen on the upper surface 14. The z value is chosen to correspond to the lower surface 16 and will be suppressed from now on. Instead we introduce the dependence on x and y, that is, on the position in the x-y-plane 2, 4:

$$I(\nu,x,y)=I_0(\nu,x,y)\exp(-\sigma_1(\nu)(N_1(x,y)-\sigma_2(\nu)N_2(x,y)).$$

Evaluating the above relation for the two ultraviolet frequencies $\nu_1$ and $\nu_2$ yields a linear system for the numbers of particles per unit area, $N_1(x, y)$ and $N_2(x, y)$, of the first substance and of the second substance, respectively:

$$\ln\left(\frac{I(\nu_1, x, y)}{I_0(\nu_1, x, y)}\right) = -\sigma_1(\nu_1)N_1(x, y) - \sigma_2(\nu_1)N_2(x, y)$$

$$\ln\left(\frac{I(\nu_2, x, y)}{I_0(\nu_2, x, y)}\right) = -\sigma_1(\nu_2)N_1(x, y) - \sigma_2(\nu_2)N_2(x, y).$$

In the present application, the functions $N_1(x, y)$ and $N_2(x, y)$ are referred to as substance images since they provide an image of the distribution of the respective substance on a surface (in the present case, the lower surface 16 of the specimen 12). They can be represented graphically in different manners, for example, as shaded single-colour images, as contour plots, or as a surface defined on the x-y-plane. The transmitted intensity values $I(\nu_1, x, y)$ and $I(\nu_2, x, y)$, normalized by incident intensity values $I_0(\nu_1, x, y)$ and $I_0(\nu_2, x, y)$, form the ultraviolet images mentioned above. They are obtained by measuring the intensity of the incident ultraviolet light and the intensity of the transmitted ultraviolet light for various positions in the x y-plane and possibly interpolating between neighbouring positions. The cross sections $\sigma_1(\nu_1)$, $\sigma_2(\nu_1)$, $\sigma_1(\nu_2)$, $\sigma_1(\nu_2)$ are assumed to be known. For example, optimal/normalized spectral absorption coefficients of hematoxylin and eosin have been published by Abe et al (see the above-mentioned article). The substance images $N_1(x, y)$ and $N_2(x, y)$ are then derived by solving the linear system given above. The approach can readily be generalized to more than two substances. In order to determine a substance image for each of M substances in the specimen 12, the specimen 12 is successively illuminated M times, each time using light of a different frequency.

Figure 3:
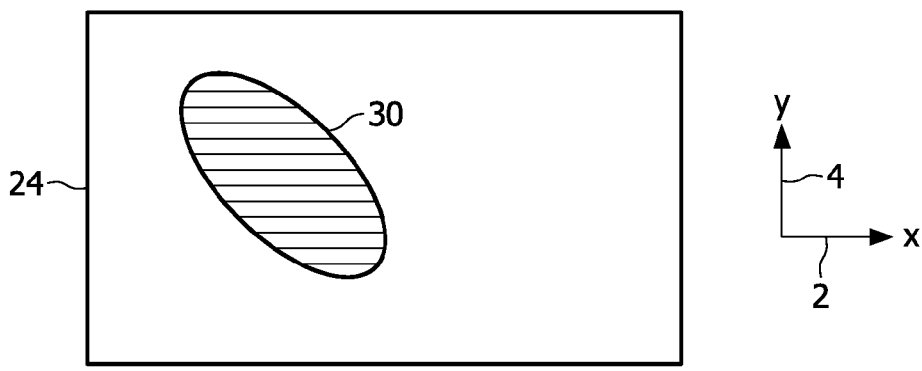
FIG. 3 schematically illustrates a first substance image.
Figure 4:
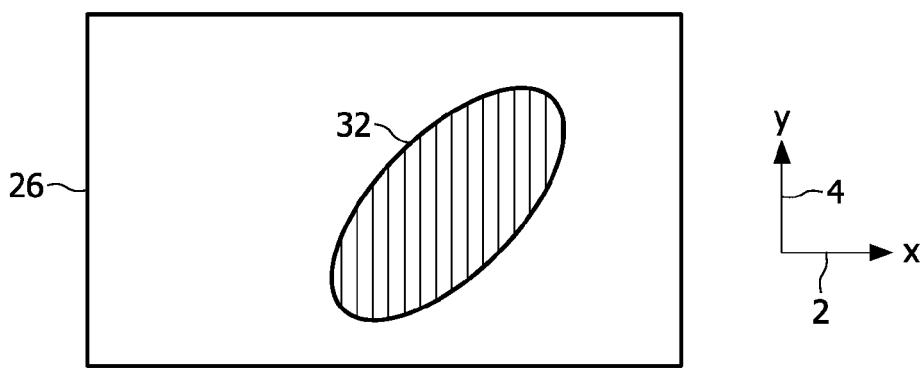
FIG. 4 schematically illustrates a second substance image.

Schematically represented in FIG. 3 and FIG. 4 are the substance image $N_1(x, y)$ of the first substance and the substance image $N_2(x, y)$ of the second image. The first substance image 24 comprises a region 30 in which the number of particles of the first substance, per unit area, is above average. Similarly, the second substance image 26 comprises a region 32 in which the number of particles of the second substance, per unit area, is above average.

Figure 5:
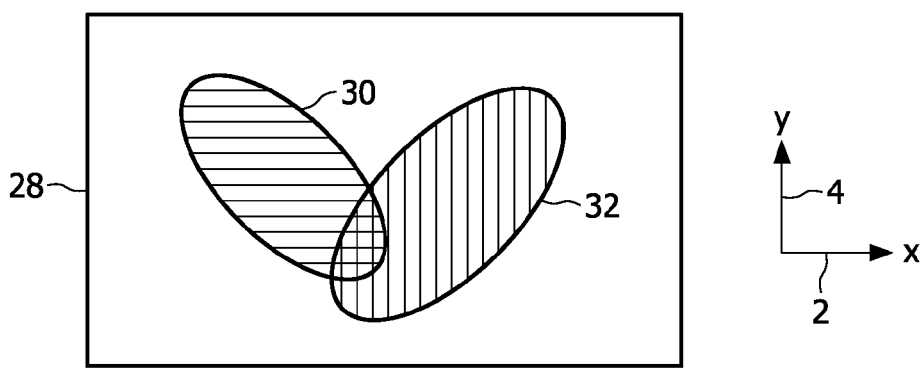
FIG. 5 schematically illustrates the second substance image superimposed on the first substance image.

In FIG. 5 the substance images $N_1(x, y)$ and $N_2(x, y)$ are represented together schematically as a "multi-substance" image. In line with the invention, a multicolour image is generated on the basis of the substance images $N_1(x, y)$ and $N_2(x, y)$, for example, by representing $N_1(x, y)$ and $N_2(x, y)$ for any selected point in the x-y plane by a red colour and by a blue colour, respectively, the intensity or saturation of the colours corresponding to the values $N_1(x, y)$ and $N_2(x, y)$, respectively. Advantageously, the multicolour image is the result of a mapping between the substance images on the one hand and the multicolour image on the other hand. That is, there is a one-to-one correspondence between the values $N_1$ and $N_2$ on the one hand and a colour value on the other hand. Preferably the one-to-one correspondence is the same for every region of the multi-colour image.

Figure 6:
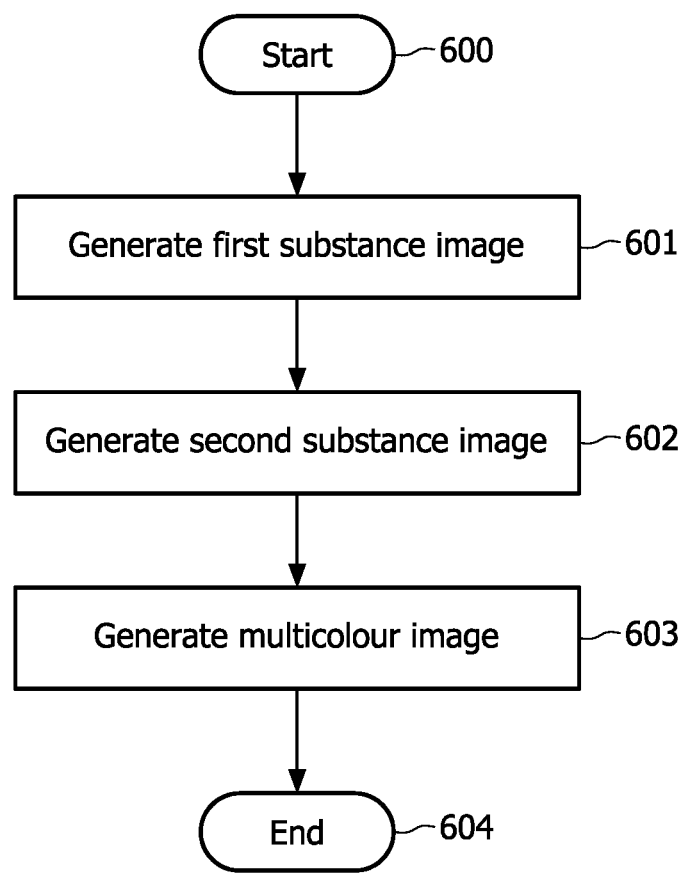
FIG. 6 is a flow chart illustrating steps of generating a multicolour image of an unstained specimen.

Referring now to FIG. 6, there is shown a flow chart of a method of generating a multicolour image of an unstained specimen, the specimen comprising at least a first substance and a second substance. In a first step 601, a first substance image $N_1(x, y)$ is generated, the first substance image indicating for every region of the image an amount of the first substance located in that region, for example, a number of particles of the substance. In a second step 602, a second substance image $N_2(x, y)$ is generated, the second substance image indicating for every region of the image an amount of the second substance located in that region, for example, a number of particles of the substance. In a subsequent third step 603, a multicolour image $C(x,y)$ is generated on the basis of the substance images, wherein C indicates a colour and can be represented by a vector in a colour space, for example, a Red-Green-Blue (RGB) additive colour space or a Cyan-Magenta-Yellow (CMYK) or CMY subtractive colour space.

While the invention has been illustrated and described in detail in the drawings and in the foregoing description, the drawings and the description are to be considered exemplary and not restrictive. The invention is not limited to the disclosed embodiments. Equivalents, combinations, and modifications not described above may also be realized without departing from the scope of the invention.

The verb "to comprise" and its derivatives do not exclude the presence of other steps or elements in the matter the "comprise" refers to. The indefinite article "a" or "an" does not exclude a plurality of the subjects the article refers to. It is also noted that a single unit may provide the functions of several means mentioned in the claims. The mere fact that certain features are recited in mutually different dependent claims does not indicate that a combination of these features cannot be used to advantage. Any reference signs in the claims should not be construed as limiting the scope.

The invention claimed is:

1. A method for generating a multicolor image of an unstained biological specimen, the specimen comprising at least two chemically different substances of interest, wherein the specimen is substantially transparent to visible light, the method comprising:
   generating for each of the substances of interest a substance image on a lower surface of the specimen indicating for every region of the substance image an amount of the substance, wherein generating the substance images comprises:
  exposing the unstained biological specimen sequentially to ultraviolet light of each of a plurality of selected frequencies;
  measuring the intensity of incident ultraviolet light at an upper surface of the specimen and the intensity of transmitted ultraviolet light at the lower surface of the specimen for various regions of the unstained biological specimen;
  estimating quantities per region of the substances based on the measured intensities of the transmitted ultraviolet light at the lower surface of the specimen normalized by the intensity of incident ultraviolet light at the upper surface of the specimen; and
  generating the substance images based on the estimated quantities; and
generating the multicolor image on the basis of the substance images, wherein an intensity or saturation of color in each region of the multicolor image is related to the estimated quantities per region, wherein generating the multicolor image comprises the steps:
  assigning to each of the substances of interest a postulated color or absorption spectrum in the visible frequency domain;
  converting each of the substance images into a single color image having the assigned color;
  superimposing the single color images according to a subtractive color model wherein each of the assigned colors of each of the substances acts as a filter transmitting only the assigned color,
  computing a transmitted light image on the basis of the substance images and the postulated color or absorption spectra, the transmitted light image indicating for every region of the image a spectrum of light that would be transmitted by the substances of interest if they were illuminated by white light, assuming that each of these substances has the postulated absorption spectrum; wherein the transmitted light image is computed using the Beer-Lambert law with, as input data, the substance images and the postulated color or absorption spectra.

2. The method as set forth in claim 1, wherein at least one of the substances of interest is assigned a color matching the color of a dye capable of binding to that substance.

3. The method as set forth in claim 1, wherein the specimen comprises as a first substance of interest protein and as a second substance of interest nucleic acid, and wherein the protein is assigned a red or pink color, and the nucleic acid is assigned a blue, violet, or purple color.

4. The method as set forth in claim 1, wherein the steps of converting and of superimposing are performed on a computer.

5. The method as set forth in claim 1, wherein converting each substance image into a single-color image comprises
  evaluating an exponential function relating an amount of substance to a color intensity.

6. The method as set forth in claim 1 , wherein the substance images are derived using the Beer-Lambert law.

7. A data carrier carrying instructions for instructing a computer to control or to perform the method as set forth in claim 1.

8. The method as set forth in claim 1, wherein a saturation of color in each region of the multicolor image is related to the estimated quantities per region.

* * * * *